(12) United States Patent
Wang et al.

(10) Patent No.: US 10,176,402 B2
(45) Date of Patent: Jan. 8, 2019

(54) PIXEL CLASSIFICATION TECHNIQUES

(71) Applicant: Apple Inc., Cupertino, CA (US)

(72) Inventors: Lejing Wang, Sunnyvale, CA (US); Daniel Ulbricht, Sunnyvale, CA (US); Lorenz Kern, Sunnyvale, CA (US); Sebastian Lieberknecht, Sunnyvale, CA (US); Tobias Hall, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/213,018

(22) Filed: Jul. 18, 2016

(65) Prior Publication Data

US 2018/0018541 A1    Jan. 18, 2018

(51) Int. Cl.
| | |
|---|---|
| G06K 9/62 | (2006.01) |
| G06K 9/74 | (2006.01) |
| H04N 5/225 | (2006.01) |
| G06T 7/11 | (2017.01) |
| G06T 7/194 | (2017.01) |
| G06T 7/136 | (2017.01) |
| G06T 7/143 | (2017.01) |

(52) U.S. Cl.
CPC ......... *G06K 9/6267* (2013.01); *G06K 9/6298* (2013.01); *H04N 5/2253* (2013.01); *H04N 5/2254* (2013.01); *G06T 7/11* (2017.01); *G06T 7/136* (2017.01); *G06T 7/143* (2017.01); *G06T 7/194* (2017.01); *G06T 2207/20012* (2013.01)

(58) Field of Classification Search
CPC .. G06K 9/6267; G06K 9/6298; H04N 5/2253; H04N 5/2254
See application file for complete search history.

(56) References Cited

U.S. PATENT DOCUMENTS

| | | |
|---|---|---|
| 6,980,691 B2 | 12/2005 | Nesterov |
| 8,233,725 B2 | 7/2012 | Zaklika |
| 8,340,420 B2 | 12/2012 | Smith |
| 8,433,144 B2 | 4/2013 | Srikrishna |

(Continued)

OTHER PUBLICATIONS

Bataineh et al., "An adaptive local binarization method for document images based on a novel thresholding method and dynamic windows", Aug. 22, 2011, Elsevier, Pattern Recognition Letters, vol. 32, p. 1805-1813.*

(Continued)

*Primary Examiner* — Vincent Rudolph
*Assistant Examiner* — Timothy Choi
(74) *Attorney, Agent, or Firm* — Blank Rome LLP (57) ABSTRACT

Systems, methods, and computer readable media to categorize a pixel (or other element) in an image into one of a number of different categories are described. In general, techniques are disclosed for using properties (e.g., statistics) of the regions being categorized to determine the appropriate size of window around a target pixel (element) and, when necessary, the manner in which the window may be changed if the current size is inappropriate. More particularly, adaptive window size selection techniques are disclosed for use when categorizing an image's pixels into one of two categories (e.g., black or white). Statistics of the selected region may be cascaded to determine whether the current evaluation window is acceptable and, if it is not, an appropriate factor by which to change the currently selected window's size.

17 Claims, 7 Drawing Sheets

(56) References Cited

U.S. PATENT DOCUMENTS

2007/0025625 A1\* 2/2007 Burian ................... G06K 9/38
382/237
2013/0129247 A1\* 5/2013 Parker ................... G06K 9/40
382/264

OTHER PUBLICATIONS

Boiangiu et al., "Local Thresholding Algorithm based on Variable Winodw Size Statistics", May 2011, HAL, Proceedings of the 18th Int. Conf. on Control Systems and Computer Sciences, vol. 2, p. 647-652.\*

Hedjam et al., "A spatially adaptive statistical method for the binarization of historical manuscripts and degraded document images", Sep. 2011, Elsevier, Pattern Recognition, vol. 44, iss. 9, . 2184-2196.\*

Yang et al., "An adaptive logical method for binarization of degraded document images", May 2000, Elsevier, Pattern Recognitoin, vol. 33, iss. 5, p. 787-807.\*

Huang et al., "Thresholding technique with adptive window selection for uneven lighting image" May 2005, Elsevier, Pattern Recognition Letters, vol. 26, iss. 6, p. 801-808.\*

Yang et al., "Binarization of Low-Quality Barcode Images Captured by Mobile Phones using Local Window of Adaptive Location and Size", Jan. 2012, IEEE, Transactions on Image Processing, vol. 21, No. 1, p. 418-425.\*

Kim, "Adaptive Thresholding Technique for Binarization of License Plate Images", Dec. 2010, OSA Publishing, Journal of the Optical Society of Korea, vol. 14, No. 4, p. 368-375.\*

\* cited by examiner

PIXEL CLASSIFICATION TECHNIQUES

BACKGROUND

Image binarization converts an image's gray level to a black and white image and is an essential task in the fields of image processing and computer vision. Frequently, image binarization is performed in the preprocessing stage of different document image processing related applications such as optical character recognition (OCR) and document image retrieval. The simplest way to use image binarization is to choose a threshold value and classify all pixels with values above this threshold as white, and all other pixels as black. The problem then is how to select the correct threshold. In many cases, finding one threshold compatible to an entire image is very difficult, and in many cases even impossible. Therefore, adaptive image binarization is needed where an optimal threshold is chosen for each image area. Factors that make finding a thresholding difficult include ambient illumination, variance of gray levels within the object and the background and insufficient contrast. Degradations in images result from poor quality of paper, the printing process, ink blot and fading, document aging, extraneous marks, noise from scanning, etc. The goal of image binarization or more generally image categorization is to remove some of these artifacts and recover an image that is close to what one would obtain under ideal printing and imaging conditions.

SUMMARY

In one embodiment the disclosed concepts provide a method to categorize a pixel in an image into one of a number of different categories (e.g., black or white). The method includes obtaining an image having a plurality of pixels where each pixel has a value (e.g., a luminosity or chroma value); selecting a first pixel from the image's plurality of pixels (e.g., a target pixel); selecting, from the image, a first plurality of pixels associated with the first pixel (e.g., an initial neighborhood of pixels); determining a first plurality of statistics based on the first plurality of pixels (e.g., the mean and variance or standard deviation of the selected pixels' luminosity, other statistics could be based on a histogram, gradient, and/or edge information derived from the region or neighborhood pixel intensities); identifying, from the image, a second plurality of pixels associated with the first pixel when a first statistic of the first plurality of statistics does not meet a first threshold, wherein a difference between the number of pixels in the first and second plurality of pixels is large (e.g., if the current neighborhood is not close to the appropriate size, increase its size by a 'large' amount); identifying, from the image, a third plurality of pixels associated with the first pixel when the first statistic meets the first threshold and a second statistic (e.g., a difference between a current image region's mean luminosity and the mean luminosity of a previous image region) from the first plurality of statistics fails to meet a second threshold (e.g., a fixed or a prior value or a dynamically determined value), wherein a difference between the number of pixels in the first and third plurality of pixels is small (e.g., if the current neighborhood is close to the appropriate size, increase its size by a 'small amount); and categorizing the first pixel into one of a plurality of categories based on the first pixel's value when the first statistic meets the first threshold and the second statistic meets the second threshold. In one embodiment, the first plurality of pixels may be selected so that they are centered about the first or target pixel (e.g., in a square or rectangular configuration). In another embodiment, the first plurality of pixels can be staged in an irregular shape about the first or target pixel. In other embodiments, after the second or third plurality of pixels are identified, the acts of determining, identifying and possibly categorizing may be repeated with either the second or third plurality of pixels (identified in the current iteration of the disclosed operation) being treated as the first plurality of pixels. A computer executable program to implement the method may be stored in any media that is readable and executable by a computer system.

DETAILED DESCRIPTION

This disclosure pertains to systems, methods, and computer readable media to categorize a pixel (or other element) in an image into one of a number of different categories. In general, techniques are disclosed for using properties (e.g., statistics) of the regions enclosing a target pixel being to determine the appropriate size of window around the target pixel (element) and, when necessary, the manner in which the window may be changed if the current size is inappropriate. More particularly, adaptive window size selection techniques are disclosed for use when categorizing an image's pixels into one of two categories (e.g., black or white). Statistics of the selected region may be cascaded to determine whether the current evaluation window is acceptable and, if it is not, an appropriate factor by which to change the currently selected window's size In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics processing systems having the benefit of this disclosure.

Figure 1:
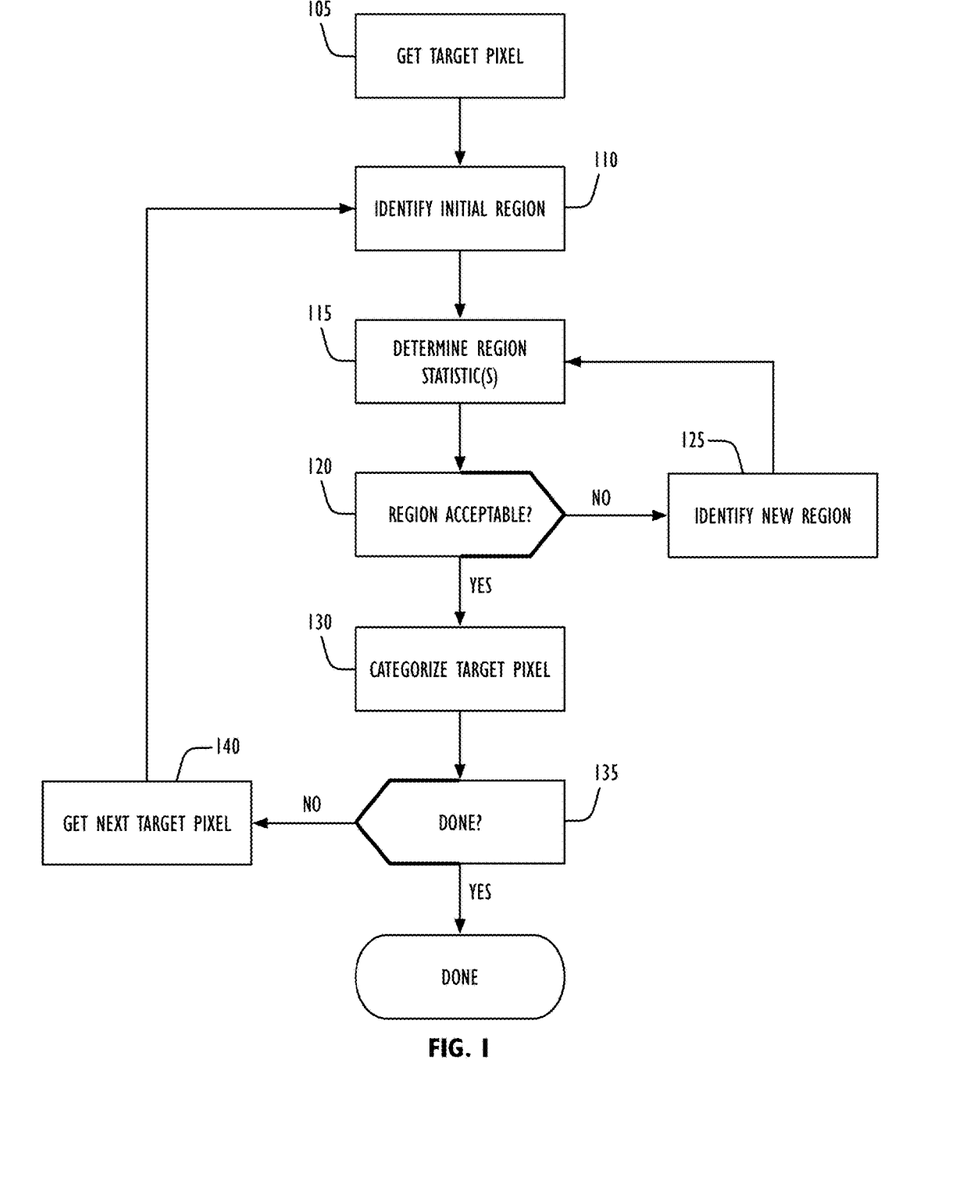
FIG. 1 shows, in flowchart form, pixel categorization operation in accordance with one embodiment.
Figure 2:
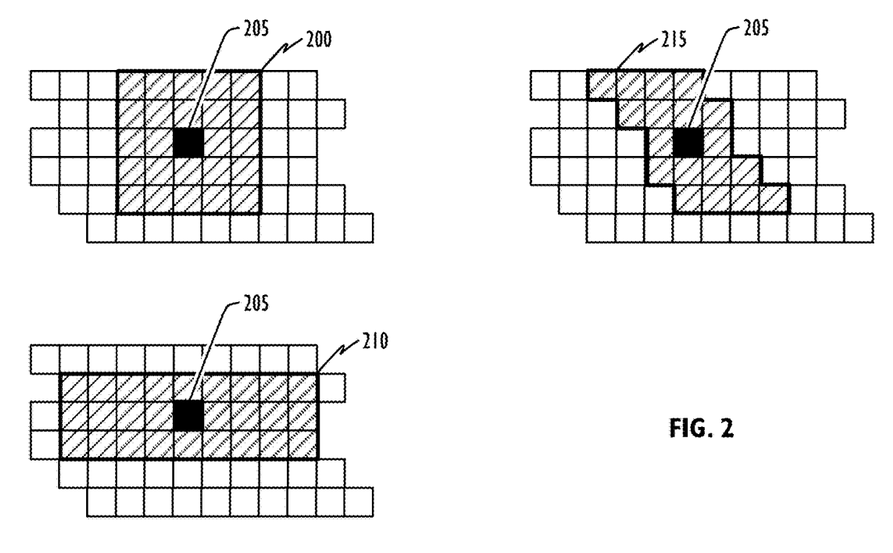
FIG. 2 illustrates various sized regions, windows or pixel neighborhoods in accordance with different embodiments.

Referring to FIG. 1, pixel categorization operation 100 in accordance with this disclosure may begin by selecting a first target pixel in an image of, for example, a document image or marker, comprising a sequence of pixels arranged in a specified pattern (block 105). With the target pixel identified, an initial region about that target pixel may be selected (block 110). Referring to FIG. 2, in one embodiment initial selected region 200 may be square and centered about target pixel 205. In another embodiment, target pixel 205 may have a regular, but not square, initial region 210 defined. In yet another embodiment, irregular initial region 215 may be defined or identified about target pixel 205. Pixel categorization operation 100 does not require a specific shape of region.

With the region defined in accordance with block 110, region statistics may be determined (block 115). In one embodiment, the mean and standard deviation of the region's pixel luminosity may make up the region's statistics. In one embodiment, more, fewer or different statistics may be used. One of ordinary skill in the art will understand that the precise statistics used may depend on the particular task being addressed and the type of image data being processed. A check may then be made to determine if the currently selected region size is adequate (block 120). If the selected region's standard deviation is less than a specified threshold (the "NO" prong of block 120), the currently selected region may be considered an improper or non-optimal size so that a new size is selected (block 125), where after operation 100 resumes at block 115. In another embodiment, region determination may be based on a cascade of two or more region statistics (see discussion below regarding FIG. 4). Continuing, if the current region's standard deviation is greater than the specified threshold (the "YES" prong of block 120), the region may be deemed to be large enough so that the target pixel may be categorized (block 130). In one embodiment, the threshold may be specified a priori based on empirical data collected from images of the type to be processed. In another embodiment the threshold may be determined based on a characteristic of the selected region. In particular, in one embodiment the threshold may be based on the region's mean intensity value. In still other embodiments, multiple statistics may be used to determine whether the selected region is acceptable (see discussion below).

Figure 3:
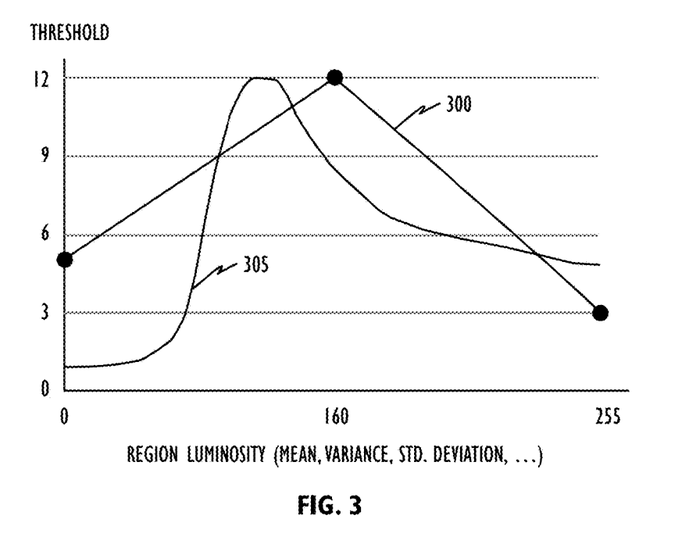
FIG. 3 illustrates possible pixel threshold functions in accordance with two embodiments.

Referring to FIG. 3, the threshold used during actions in accordance with block 120 may be based on the region's mean luminosity. The particular threshold functions 300 and 305 shown in FIG. 3 are not unique (e.g., they may be linear, piece-wise linear such as 300 or non-linear such as 305). That is, any function that works for the target implementation may be used. The particular threshold functions shown in FIG. 3 may be determined empirically by analyzing a number of images of the type to be processed. In other embodiments, the selected region's histogram, gradient, mean, and/or edge information derived from the region's pixel intensities may be used to determine quality of the current region.

Returning to FIG. 1, the target pixel's category may be determined by comparing it's (intensity) value to one or more characteristics or statistics of the target pixel's region. In one embodiment the comparison may be made against the region's mean. For example, if the target pixel's intensity is less than the selected region's mean it may be classified as a 'black' pixel, otherwise it may be classified as a 'white' pixel (block 130). After classifying the current target pixel a check may be made to determine if the image has other pixels that need to be classified (block 135). If the image has pixels that have not yet been classified by operation 100 (the "NO" prong of block 135), a next target pixel may be selected (block 140), where after operation 100 continues at block 110. If all of the image's pixels have been processed (the "YES" prong of block 135), operation 100 is complete. It should be noted that pixel categorization operation 100 need not be applied to all pixels in an image. Instead, some embodiments may evaluate a subset of all pixels in an image. For example, a preprocessing step may restrict what pixels need to be evaluated by determining that the target marker (or other visual identifier) is in a given quadrant of the image.

Figure 4:
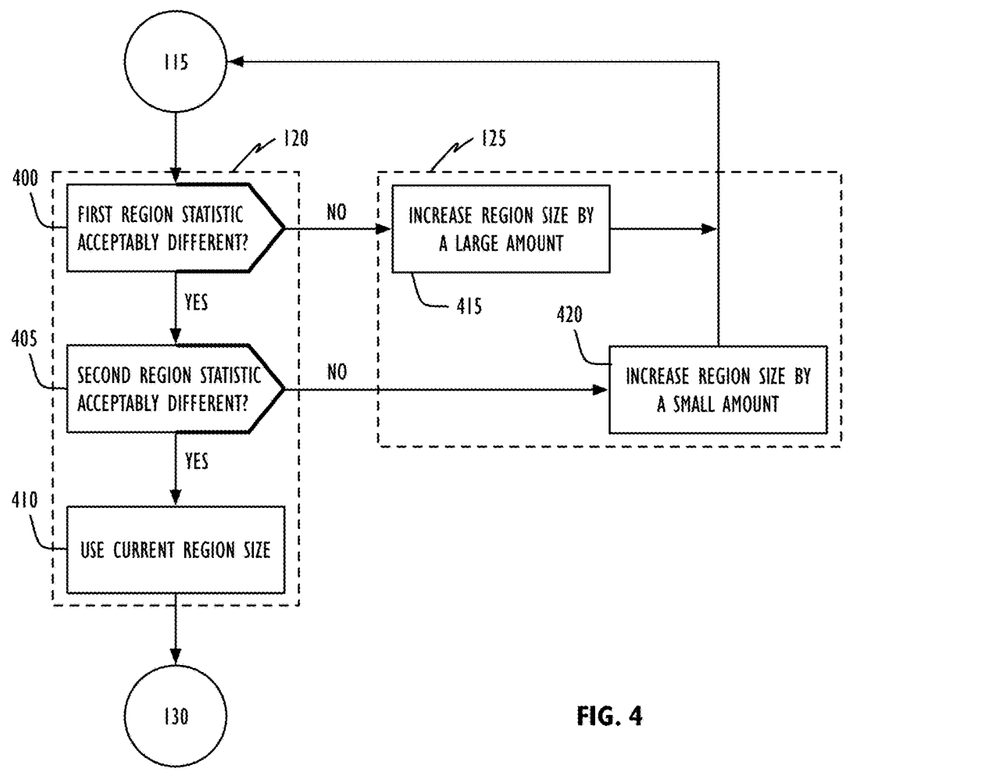
FIG. 4 shows, in flowchart form, pixel region adjustment operations in accordance with one embodiment.

By way of example and referring to FIG. 4, in one embodiment blocks 120 and 125 may implement an efficient and robust method to determine an optimal window (e.g., 200, 210, 215) based on multiple image properties derived from the pixels neighboring the target pixel and at least one image property criterion. The image property criterion may be determined by one or more image properties of the local window and may be based on, for example, the standard deviation, mean, histogram, edge, and/or gradient information of the neighborhood pixels. In one embodiment, actions in accordance with block 120 may first test to determine if a first statistic (e.g., the pixel intensity mean, variance or standard deviation) of the current selected region is acceptable (block 400). If it is (the "YES" prong of block 400), a second check may be made to determine if a second statistic is acceptably different (block 405). In one embodiment, the second statistic may be determined based on the current image region and a previous image region. For example, the second statistic may be a difference between the mean pixel intensity of the current image region and the mean pixel intensity of a previous image region. In another example, the second statistic may be a difference between the pixel intensity variances of the current image region and the previous image region. If this second statistic is also acceptable (the "YES" prong of block 405), the current region's size is acceptable (block 410) where after operation 100 continues at block 130. If, on the other hand, the first statistic is determined not to be acceptably different from that of the prior region (the "NO" prong of block 400), the current region may be increased by a "large" amount (block 415). If the second statistic is determined not to be acceptably different from that of the prior region (the "NO" prong of block 405), the current region may be increased or reduced by a "small" amount (block 420). (See discussion below regarding FIGS. 5 and 6.) From above, in one embodiment the first statistic may be the variance or standard deviation of the selected region's pixel intensity while the second statistic may be the mean of the selected region's pixel intensity. This should not be considered limiting. As can be seen the selected pixel region may be adjusted in one of a number of different steps (two in the example of FIG. 4). In one approach, a small size region is the first region size selected so that if the test in accordance with block 120 (e.g., blocks 400-410) fails, the region size may be increased. In other embodiments, a first selected region size may be as close to an expected optimal size as empirical data suggests. In this approach, the region size may be increased and/or decreased in size until an acceptable or optimal region size is found. In another embodiment, rather than growing the window as described above, it is possible to shift the region a few pixels left, right, up or down so that the first and second regions overlap one another. In general, the shift may cause a change in the number of pixels in each region to be on the same order as that discussed above: large (e.g., see FIG. 4 at 415); or small (e.g., see FIG. 4 at 420). The effect may be the same without the need for additional computation.

Figure 5A:
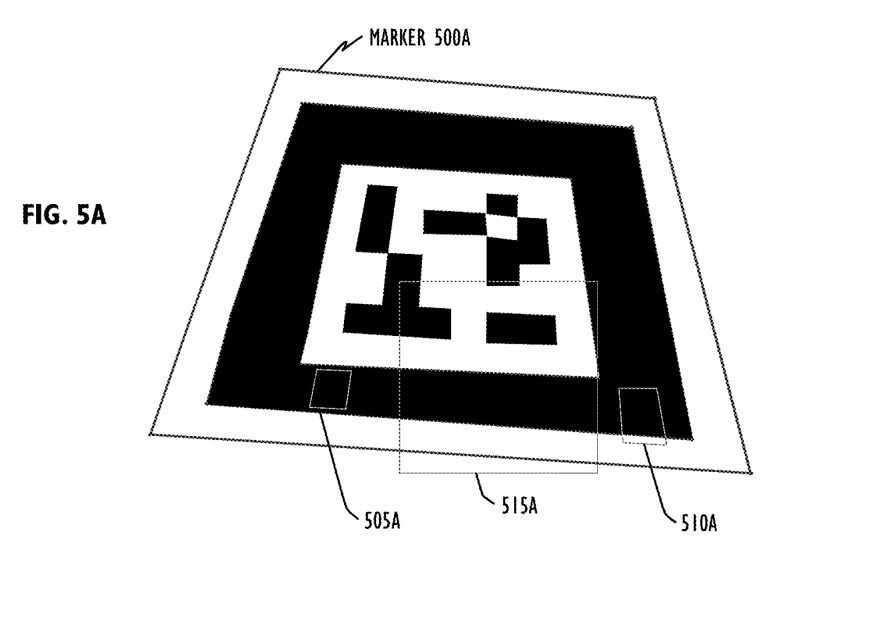
FIGS. 5A and 5B show two illustrative types of images to which the disclosed subject matter may be applied.
Figure 5B:
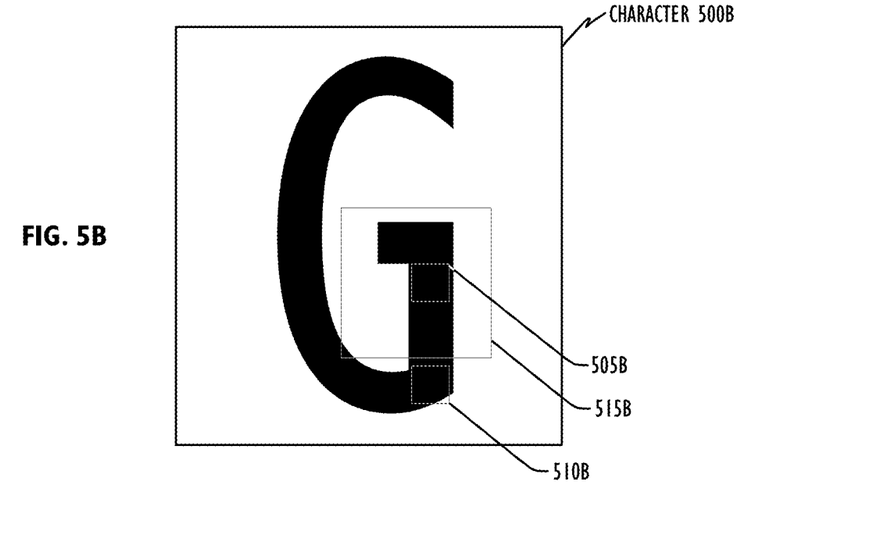

Referring to FIG. 5, given images 500A (marker) and 500B (document character) three region sizes 505A/B, 510A/B and 515A/B may be selected during operation 100. As shown, regions 505A and 505B are uniformly dark, regions 510A and 510B are mostly a uniform intensity so that it may be referred to as "unbalanced," and regions 515A and 515B are large enough to have roughly equal numbers of white and black pixels (i.e., the variance of region 515's intensity is much larger than that of either region 505 and 510).

Figure 6:
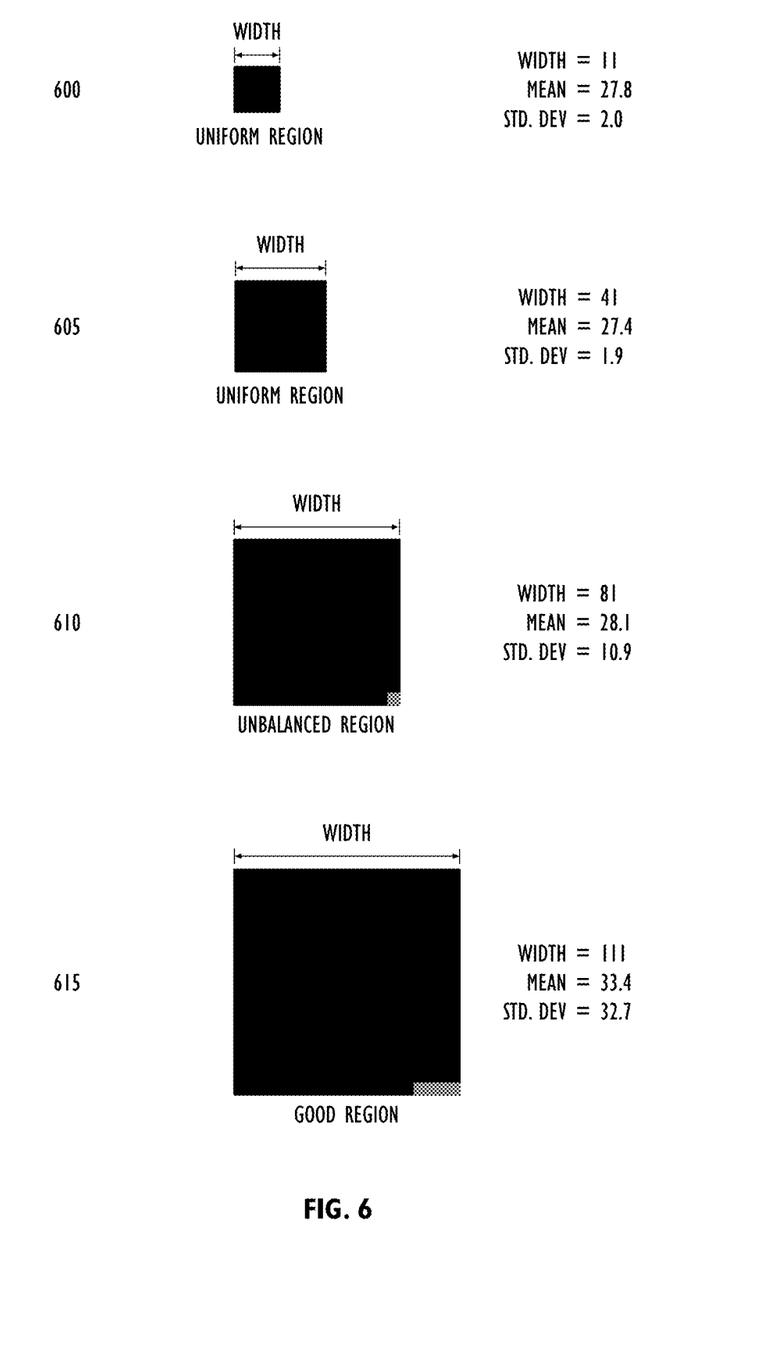
FIG. 6 illustrates pixel neighborhood or window adjustment operations in accordance with one embodiment.

Referring to FIG. 6, operations to determine a new region size in accordance with blocks 120 and 125 may be based on a number of factors. By way of example, if region 600 is the currently selected region it can be seen that the variance (standard deviation) between pixel intensities is very low (2.0). This is an example that the first statistic (e.g., the variance) does not meet the first threshold (e.g., the threshold may be 5). In this case there may be insufficient information within region 600 with which to determine what category the target pixel belongs in (e.g., black or white). In light of this, a large change in region size may be made from a 11×11 region 600 to a 41×41 region 605 resulting, for example, selecting region 605. If region 605 is the currently selected region it can be seen that the variance (standard deviation) between pixel intensities is also low (1.9); below the threshold 5. In this case there may also be insufficient information with which to determine what category the target pixel belongs in. In the illustrated embodiment, because the change in pixel intensity between current region 605 and prior region 600 is small, a large change in region size may again be made (the "NO" prong of block 400); e.g., from an 41×41 region 605 to a 81×81 region 610, a factor of approximately 2 although this could be more (or less). As shown in FIG. 6, the variance (standard deviation) in pixel intensity of new region 610 is sufficiently large and above the threshold 5. This is an example where the first statistic meets the first threshold (see FIG. 1 at 120 and FIG. 4 at 400). However, the mean pixel intensity between the two regions is fairly consistent. This is an example where the second statistic does not meet the second threshold (see FIG. 1 at 120 and FIG. 4 at 405). In one embodiment this means region 610 is still not acceptably sized. Accordingly, new region 615 may be identified. Unlike the transition between regions 600 to 605 and 605 to 610, this change may be "small" (the "NO" prong of block 405); from (81×81) to (111×111), a factor of less than 2. Because new region 615's pixel intensity variance (standard deviation) is sufficiently large (satisfying the first threshold) and its mean is substantially different from that of prior region 610 (satisfying the second threshold), region 615 may be determined to be an acceptable size. It should be understood that what constitutes "small" or "large," and what is an "acceptable size" are each implementation specific determinations. That is, in one embodiment a large (small) difference may be a factor of 1.75 (less than 1.75) while in another embodiment, a large (small) difference may be a factor or 3 (less than 3). In other embodiments, rather than changing the overall number of pixels in a region, the shape of the regions may be changed. For example, a first region may be 80×80 pixels (6,400 pixels), a second region may be 40×160 pixels (6,400 pixels), and a third region may be 160×40 pixels (6,400 pixels).

In another embodiment, a pixel-similar neighborhood of the target pixel may be determined. A pixel-similar neighborhood could be determined based on variance, standard deviation, mean, histogram, edge, and/or gradient information. The pixel-similar neighborhood may contain pixels that have similar property values as that of the target pixel, e.g., pixels that have similar intensity values, similar gradient directions, or similar gradient magnitudes. By way of example, threshold computed based on the mean pixel intensity (e.g., see FIG. 3) of the selected window (e.g., region 615) may be used to classify other pixels in the pixel-similar neighborhood of the target pixel. As another example, if the standard deviation of pixels in a neighborhood of the target pixel are below a certain value, the neighborhood may be determined as a pixel-similar neighborhood. This could significantly speed up pixel categorization operations in accordance with this disclosure. In one embodiment, acts in accordance with block 115 may further determine if the current region—or a part thereof—is a pixel similar neighborhood for the current target pixel.

Figure 7:
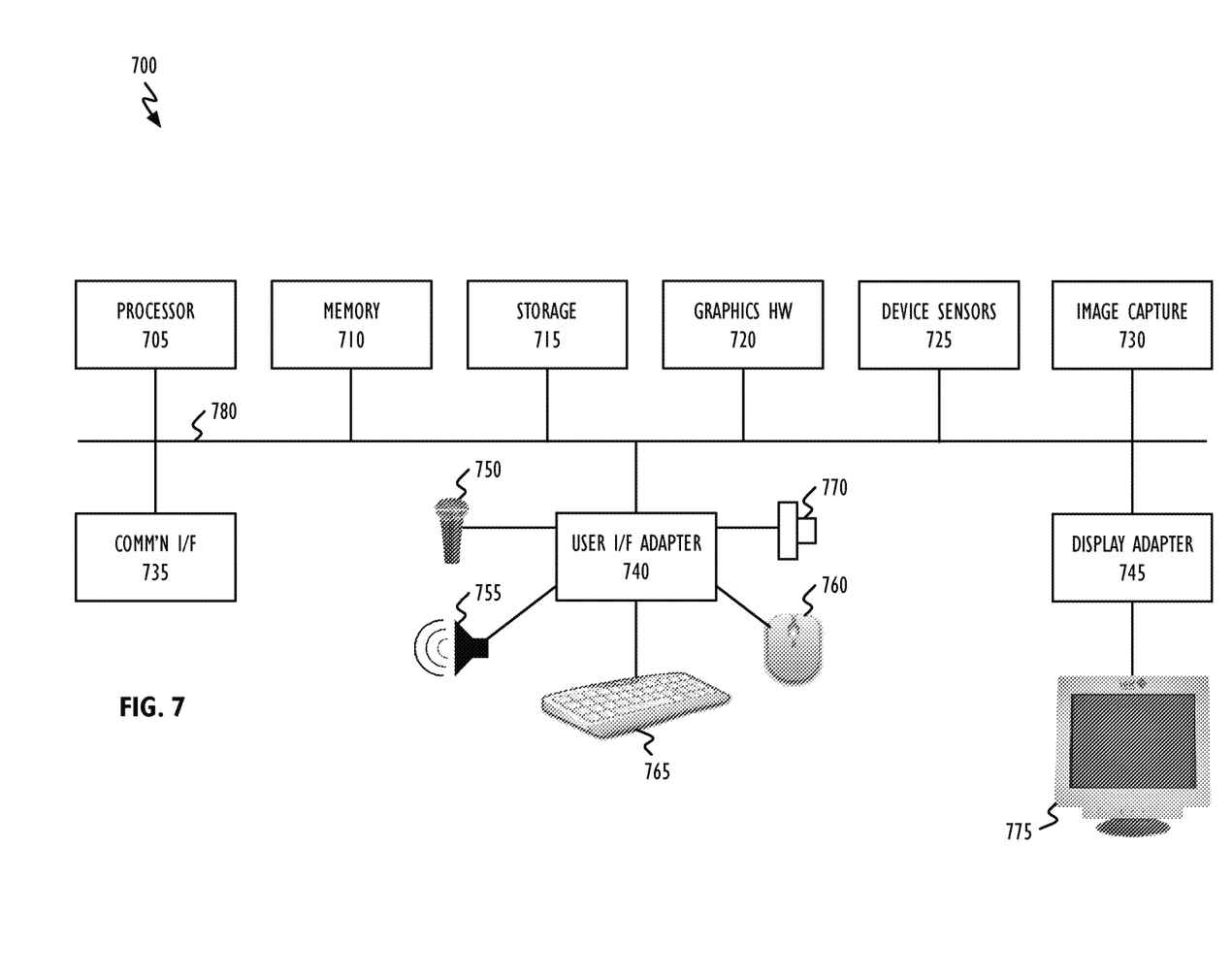
FIG. 7 shows, in block diagram form, a computer system in accordance with one embodiment.

Referring to FIG. 7, the disclosed image pixel categorization operations in accordance with this disclosure may be performed by representative computer system 700 (e.g., a general purpose computer system such as a desktop, laptop, notebook or tablet computer system, or a gaming device). Computer system 700 can be housed in single computing device or spatially distributed between two or more different locations. Computer system 700 may include one or more processors 705, memory 710, one or more storage devices 715, graphics hardware 720, device sensors 725, image capture module 730, communication interface 735, user interface adapter 740 and display adapter 745—all of which may be coupled via system bus or backplane 780.

Processor module or circuit 705 may include one or more processing units each of which may include at least one central processing unit (CPU) and/or at least one graphics processing unit (GPU); each of which in turn may include one or more processing cores. Each processing unit may be based on reduced instruction-set computer (RISC) or complex instruction-set computer (CISC) architectures or any other suitable architecture. Processor module 705 may be a system-on-chip, an encapsulated collection of integrated circuits (ICs), or a collection of ICs affixed to one or more substrates. Memory 710 may include one or more different types of media (typically solid-state, but not necessarily so) used by processor 705, graphics hardware 720, device sensors 725, image capture module 730, communication interface 735, user interface adapter 740 and display adapter 745. For example, memory 710 may include memory cache, read-only memory (ROM), and/or random access memory (RAM). Storage 715 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 710 and storage 715 may be used to retain media (e.g., audio, image and video files), preference information, device profile information, computer program instructions or code organized into one or more modules and written in any desired computer programming languages, and any other suitable data. When executed by processor(s) 705 and/or graphics hardware 720 and/or functional elements within image capture module 730 such computer program code may implement one or more of the methods described herein. Graphics hardware module or circuit 720 may be special purpose computational hardware for processing graphics and/or assisting processor 705 perform computational tasks. In one embodiment, graphics hardware 720 may include one or more GPUs, and/or one or more programmable GPUs and each such unit may include one or more processing cores. Device sensors 725 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor. Image capture module or circuit 730 may include one or more image sensors, one or more lens assemblies, and any other known imaging component that enables image capture operations (still or video). In one embodiment, the one or more image sensors may include a charge-coupled device (CCD) or complementary metal oxide semiconductor (CMOS) sensor. Image capture module 730 may also include an image signal processing (ISP) pipeline that is implemented as specialized hardware, software, or a combination of both. The ISP pipeline may perform one or more operations on raw images (also known as raw image files) received from image sensors and can also provide processed image data to processor 705, memory 710, storage 715, graphics hardware 720, communication interface 735 and display adapter 745. Communication interface 735 may be used to connect computer system 700 to one or more networks. Illustrative networks include, but are not limited to, a local network such as a Universal Serial Bus (USB) network, an organization's local areanetwork, and a wide area network such as the Internet. Communication interface 735 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 740 may be used to connect microphone(s) 750, speaker(s) 755, pointer device(s) 760, keyboard 765 (or other input device such as a touch-sensitive element), and a separate image capture element 770—which may or may not avail itself of the functions provided by graphics hardware 720 or image capture module 730. Display adapter 745 may be used to connect one or more display units 775 which may also provide touch input capability. System bus or backplane 780 may be comprised of one or more continuous (as shown) or discontinuous communication links and be formed as a bus network, a communication network, or a fabric comprised of one or more switching devices. System bus or backplane 780 may be, at least partially, embodied in a network router or hub, a wireless access point (AP) or repeater, a set-top box, or a combination thereof.

Figure 8:
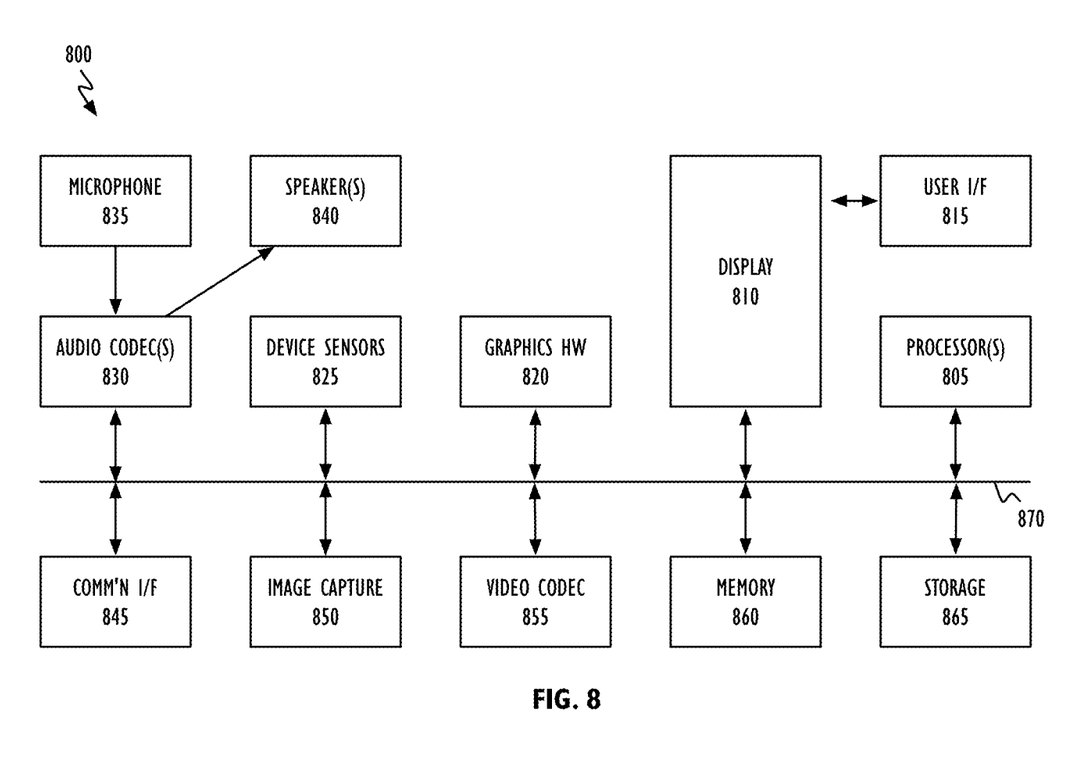
FIG. 8 shows, in block diagram form, a multi-function electronic device in accordance with one embodiment.

Referring to FIG. 8, a simplified functional block diagram of illustrative mobile electronic device 800 is shown according to one embodiment. Electronic device 800 could be, for example, a mobile telephone, personal media device, a notebook computer system, or a tablet computer system. As shown, electronic device 800 may include processor module or circuit 805, display 810, user interface module or circuit 815, graphics hardware module or circuit 820, device sensors 825, microphone(s) 830, audio codec(s) 835, speaker(s) 840, communications module or circuit 845, image capture module or circuit 850, video codec(s) 855, memory 860, storage 865, and communications bus 870.

Processor 805, display 810, user interface 815, graphics hardware 820, device sensors 825, communications circuitry 845, image capture module or circuit 850, memory 860 and storage 865 may be of the same or similar type and serve the same function as the similarly named component described above with respect to FIG. 7. Audio signals obtained via microphone 830 may be, at least partially, processed by audio codec(s) 835. Data so captured may be stored in memory 860 and/or storage 865 and/or output through speakers 840. Output from image capture module or circuit 850 may be processed, at least in part, by video codec(s) 855 and/or processor 805 and/or graphics hardware 820. Images so captured may be stored in memory 860 and/or storage 865.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, those of ordinary skill in the art will understand that the basic tenants set forth above may be extended to multiple categories. That is, the disclosed techniques may be applied to categorizing elements of an image into more than 2 categories. For example, in order to categorize an element into 1 of 3 categories, two thresholds may be needed. In one embodiment, the first statistic may be compared with two different thresholds. One threshold may be used as a boundary for 2 categories, while two thresholds may be used as boundaries for 3 categories. Further, a threshold may be a scalar value, a vector, or a N-dimensional value (e.g., a 2 dimensional matrix). Further, FIGS. 1 and 4 show flowcharts illustrating various aspects of determining whether a pixel or element in an image belongs to one category or another in accordance with the disclosed embodiments. In one or more embodiments, one or more of the disclosed steps may be omitted, repeated, and/or performed in a different order than that described herein. Accordingly, the specific arrangement of steps or actions shown in FIGS. 1 and 4 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A pixel categorization method, comprising:
   obtaining an image having a plurality of pixels, each pixel having a value;
   selecting a first pixel from the image's plurality of pixels;
   selecting, from the image, a first plurality of pixels comprising the first pixel;
   determining a first plurality of statistics based on the first plurality of pixels;
   identifying, from the image, a second plurality of pixels comprising the first pixel when a first statistic for the first plurality of pixels does not meet a first threshold;
   determining a difference between a second statistic for the first plurality of pixels and a second statistic for the second plurality of pixels;
   in response to determining that the difference between the second statistic for the first plurality of pixels and the second statistic for the second plurality of pixels fails to meet a second threshold, identifying, from the image, a third plurality of pixels comprising the first pixel; and
   in response to determining that a first statistic for the third plurality of pixels satisfies the first threshold and a difference between the second statistic for the second plurality of pixels and a second statistic for the third plurality of pixels satisfies the second threshold, categorizing the first pixel into one of a plurality of categories based on the first pixel's value and characteristics of the third plurality of pixels,
   wherein a difference between a number of pixels in the first plurality of pixels and a number of pixels in the second plurality of pixels is larger than a difference between the number of pixels in the first plurality of pixels and a number of pixels in the third plurality of pixels.

2. The method of claim 1, wherein the first statistic for the first plurality of pixels is based on a function of the first plurality of pixels' luminosity values.

3. The method of claim 1, wherein the second statistic for the first plurality of pixels is based on a mean luminosity of the first plurality of pixels, and wherein the second statistic for the second plurality of pixels comprises a mean luminosity of the second plurality of pixels.

4. The method of claim 1, wherein categorizing comprises:
   categorizing the first pixel into a first category when the first pixel's value is greater than a third statistic for the third plurality of pixels, and
   categorizing the first pixel into a second category when the first pixel's value is less than or equal to the third statistic for the third plurality of pixels.

5. The method of claim 4, further comprising
   selecting, in the image, a pixel-similar region associated with the first pixel, the pixel-similar region comprising a fourth plurality of pixels;
   determining a first statistic for the fourth plurality of pixels; and
   categorizing at least one pixel in the pixel-similar region into one of the plurality of categories based on the third statistic for the third plurality of pixels when the first statistic for the fourth plurality of pixels meets a third threshold.

6. The method of claim 1, wherein:
   the first statistic for the first plurality of pixels comprises a variance of the first plurality of pixel values, and
   the second statistic for the first plurality of pixels is related to a mean of the first plurality of pixel values.

7. A non-transitory program storage device, readable by a processor and comprising instructions stored thereon to cause one or more processors to:
   obtain an image having a plurality of pixels, each pixel having a value;
   select a first pixel from the image's plurality of pixels;
   select, from the image, a first plurality of pixels comprising the first pixel;
   determine a first plurality of statistics based on the first plurality of pixels;
   identify, from the image, a second plurality of pixels comprising the first pixel when a first statistic for the first plurality of pixels does not meet a first threshold;
   determine a difference between a second statistic for the first plurality of pixels and a second statistic for the second plurality of pixels;
   in response to a determination that the difference between the second statistic for the first plurality of pixels and the second statistic for the second plurality of pixels fails to meet a second threshold, identify, from the image, a third plurality of pixels comprising the first pixel; and
   in response to a determination that a first statistic for the third plurality of pixels satisfies the first threshold and a difference between the second statistic for the second plurality of pixels and a second statistic for the third plurality of pixels satisfies the second threshold, categorize the first pixel into one of a plurality of categories based on the first pixel's value and characteristics of the third plurality of pixels,
   wherein a difference between a number of pixels in the first plurality of pixels and a number of pixels in the second plurality of pixels is larger than a difference between the number of pixels in the first plurality of pixels and a number of pixels in the third plurality of pixels.

8. The non-transitory program storage device of claim 7, wherein the first statistic for the first plurality of pixels is based on a function of the first plurality of pixels' luminosity values.

9. The non-transitory program storage device of claim 7, wherein the second statistic for the first plurality of pixels is based on a mean luminosity of the first plurality of pixels, and wherein the second statistic for the second plurality of pixels comprises a mean luminosity of the second plurality of pixels.

10. The non-transitory program storage device of claim 7, wherein the instructions to cause one or more processors to categorize comprise instructions to cause the one or more processors to:
    categorize the first pixel into a first category when the first pixel's value is greater than a third statistic for the third plurality of pixels; and
    categorize the first pixel into a second category when the first pixel's value is less than or equal to the third statistic for the third plurality of pixels.

11. The non-transitory program storage device of claim 10, further comprising instructions to cause the one or more processors to:
    select, in the image, a pixel-similar region associated with the first pixel, the pixel-similar region comprising a fourth plurality of pixels;
    determine a first statistic for the fourth plurality of pixels; and
    categorize at least one pixel in the pixel-similar region into one of the plurality of categories based on the third statistic for the third plurality of pixels when the fourth statistic first statistic for the fourth plurality of pixels meets a third threshold.

12. The non-transitory program storage device of claim 7, wherein:
the first statistic for the first plurality of pixels comprises a variance of the first plurality of pixel values, and
the second statistic for the first plurality of pixels is related to a mean of the first plurality of pixel values.

13. An electronic device, comprising:
an imaging system including a lens and an image sensor, the lens configured to direct light from a scene onto the image sensor;
memory communicatively coupled to the imaging system; and
one or more processors communicatively coupled to the imaging system and the memory and configured to execute instructions stored in the memory, the instructions configured to cause the one or more processors to—
obtain an image having a plurality of pixels, each pixel having a value;
select a first pixel from the image's plurality of pixels;
select, from the image, a first plurality of pixels comprising the first pixel;
determine a first plurality of statistics based on the first plurality of pixels;
identify, from the image, a second plurality of pixels comprising the first pixel when a first statistic for the first plurality of pixels does not meet a first threshold;
determine a difference between a second statistic for the first plurality of pixels and a second statistic for the second plurality of pixels;
in response to a determination that the difference between the second statistic for the first plurality of pixels and the second statistic for the second plurality of pixels fails to meet a second threshold, identify, from the image, a third plurality of pixels comprising the first pixel; and
in response to a determination that a first statistic for the third plurality of pixels satisfies the first threshold and a difference between the second statistic for the second plurality of pixels and a second statistic for the third plurality of pixels satisfies the second threshold, categorize the first pixel into one of a plurality of categories based on the first pixel's value and characteristics of the third plurality of pixels,
wherein a difference between a number of pixels in the first plurality of pixels and a number of pixels in the second plurality of pixels is larger than a difference between the number of pixels in the first plurality of pixels and a number of pixels in the third plurality of pixels.

14. The electronic device of claim 13, wherein the first statistic for the first plurality of pixels is based on a function of the first plurality of pixels' luminosity values.

15. The electronic device of claim 13, wherein the instructions to cause the one or more processors to categorize comprise instructions to cause the one or more processors to:
categorize the first pixel into a first category when the first pixel's value is greater than a third statistic for the third plurality of pixels; and
categorize the first pixel into a second category when the first pixel's value is less than or equal to the third statistic for the third plurality of pixels.

16. The electronic device of claim 15, further comprising instructions to cause the one or more processors to:
select, in the image, a pixel-similar region associated with the first pixel, the pixel-similar region comprising a fourth plurality of pixels,
determine a first statistic for the fourth plurality of pixels; and
categorize at least one pixel in the pixel-similar region into one of the plurality of categories based on the third statistic for the third plurality of pixels when the first statistic for the fourth plurality of pixels meets a third threshold.

17. The electronic device of claim 13, wherein:
the first statistic for the first plurality of pixels comprises a variance of the first plurality of pixel values, and
the second statistic for the first plurality of pixels is related to a mean of the first plurality of pixel values.

* * * * *

UNITED STATES PATENT AND TRADEMARK OFFICE
CERTIFICATE OF CORRECTION

PATENT NO. : 10,176,402 B2
APPLICATION NO. : 15/213018
DATED : January 8, 2019
INVENTOR(S) : Lejing Wang et al.

Page 1 of 1

It is certified that error appears in the above-identified patent and that said Letters Patent is hereby corrected as shown below:

On the Title Page

(72) Inventors: Tobias Hall - the correct spelling is -- Tobias Holl --

In the Claims

Claim 16, Column 12, Line 29, should read -- fourth plurality of pixels; --

Signed and Sealed this
Nineteenth Day of March, 2019

Andrei Iancu
*Director of the United States Patent and Trademark Office*